Figure 1:
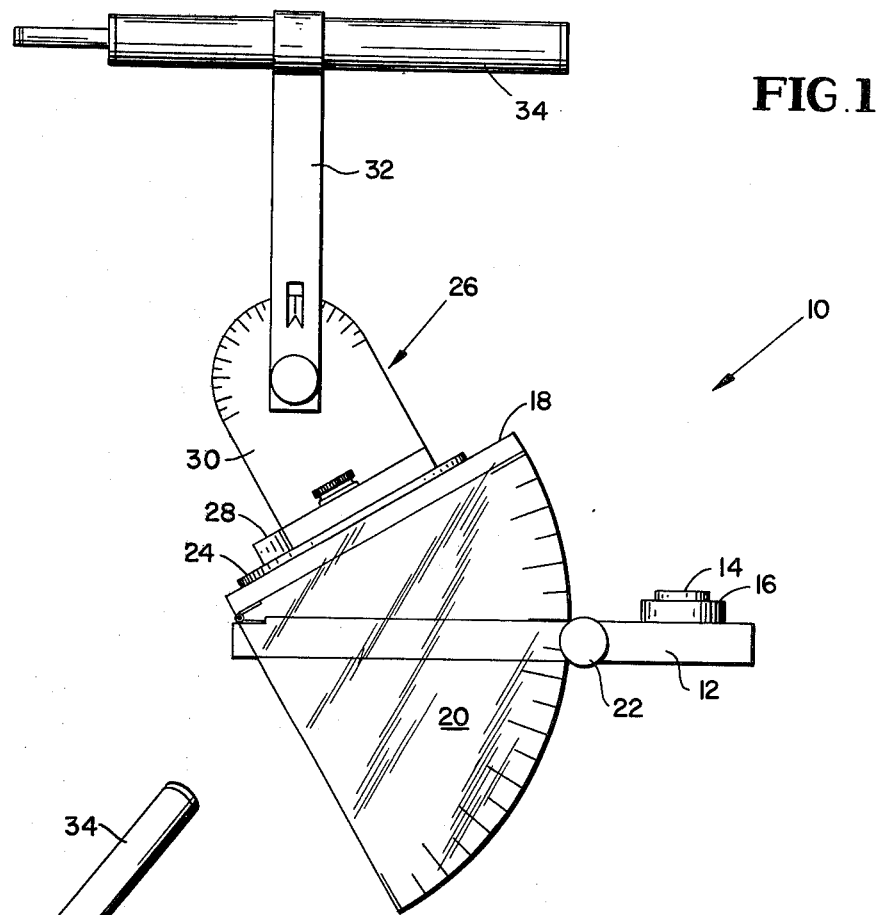

United States Patent [19]

Inge

[11] 4,138,826

[45] Feb. 13, 1979

[54] DEVICE FOR LOCATING CELESTIAL BODIES

[76] Inventor: Andy Inge, 803 W. 28th St. #202, Austin, Tex. 78705

[21] Appl. No.: 797,825

[22] Filed: May 17, 1977

[51] Int. Cl.² ............... G01C 1/00; G01C 17/34
[52] U.S. Cl. ............................... 33/268; 33/273; 33/281
[58] Field of Search ............ 33/268, 272, 273, 275 R, 33/281

[56] References Cited

U.S. PATENT DOCUMENTS

| 247 | 8/1859 | Yeiser | 33/268 |
|---|---|---|---|
| 22,913 | 2/1859 | Yeiser | 33/268 |
| 45,954 | 1/1865 | Emmanuel | 33/268 |
| 1,130,625 | 3/1915 | Peck | 33/268 |

FOREIGN PATENT DOCUMENTS 2093 of 1878 United Kingdom ............ 33/268

Primary Examiner—William D. Martin, Jr.

[57] ABSTRACT

The invention disclosed relates to a device for locating celestial bodies by reference to Right Ascension and Declination, and the device is intended to locate using either, R. A. with Declination, or Azimuth with Altitude, or both. However, the use of R. A. and Declination is its primary asset due to the accuracy of its use. The device includes a support platform with orientation indicators, and a pivotal inclined platform is positioned a right ascension-azimuth dial and a right ascension indicator-declination scale piece, both joined about a common axis for rotation. The right ascension indicator-declination scale piece has a support arm disposed thereon for support of a telescope which serves as a viewing means for the celestial body which is located. The device is simply configurated, extremely accurate, and highly effective for use by astronomers generally.

1 Claim, 2 Drawing Figures

U.S. Patent  Feb. 13, 1979  4,138,826

DEVICE FOR LOCATING CELESTIAL BODIES

This invention relates to a device for locating celestial bodies in a simple efficient manner based on reference data to celestial bodies, to azimuth and fixed celestial coordinates, or altitude mathematical conditions.

Numerous devices are available in the prior art for providing astronomers means for locating celestial bodies. Typically, the devices are highly complicated to operate and of practical use to a very limited few. Also, the expense of such devices is beyond that of the amateur astronomer.

A number of devices are also available to amateur astronomers for locating celestial bodies. Typically, these devices are simply fashioned and do not have the necessary accuracy for effective location and identification purposes.

It has now been found that by means of the device of the present invention, there is provided a device having a minimum number of elements, simply configurated in an inexpensive, reliable, foolproof manner which imparts the user with a tool for improved observation accuracy and thereby overcomes the need for accurate devices for locating celestial bodies by amateur astronomers.

Generally stated, the present invention provides a device comprising in combination, a support platform having orientation means disposed thereon, an inclined platform pivoted by one end to the support platform, an indicator disposed intermediate the inclined platform and the support platform for defining the relative degree of inclination, a right ascension-azimuth dial in cooperation with a right ascension indicator-declination scale piece, both operated on the relative plane of the inclined platform, and a telescope mounted onto a movable arm piece secured to a vertically projecting portion of the ascension indicator-declination scale piece.

Figure 2:
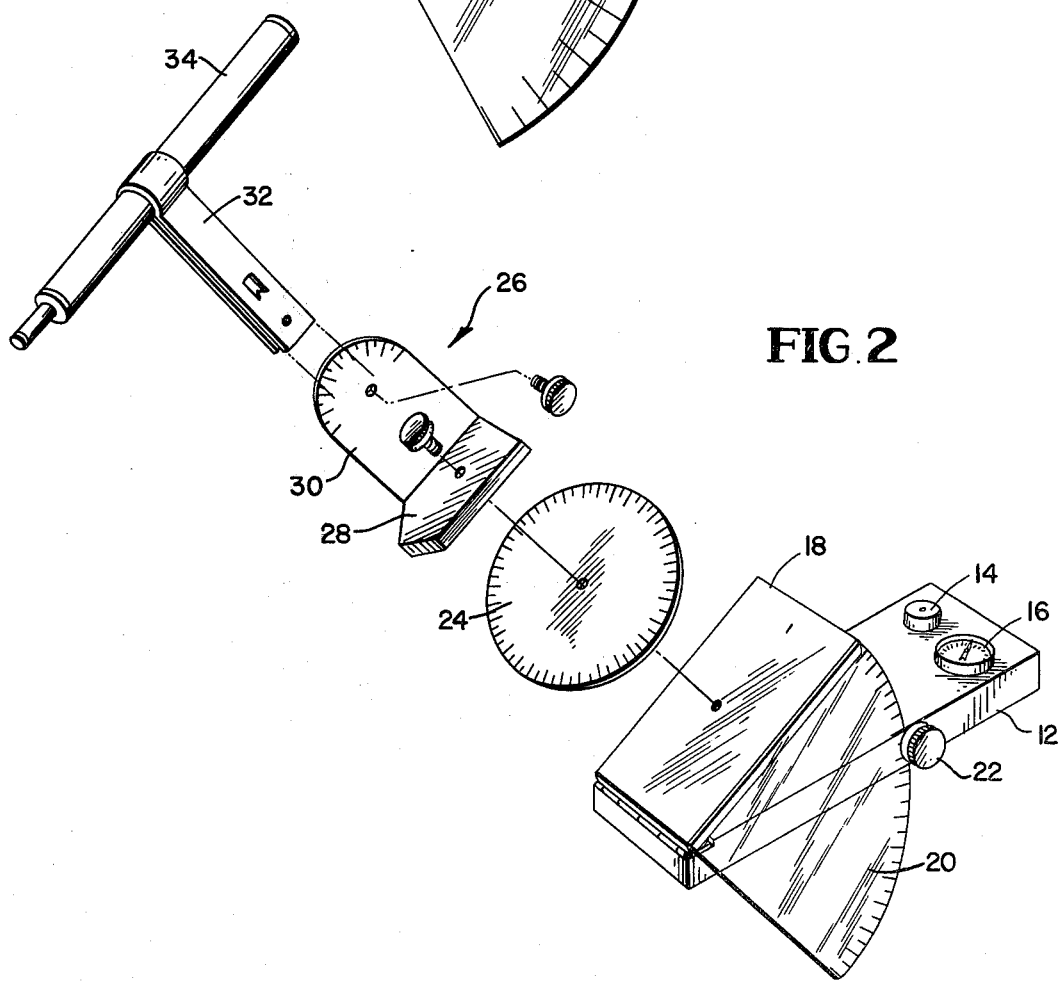

Practice of the present invention will become more apparent by consideration of the more detailed description following:

In the drawings:

FIG. 1 is a side elevational view of the device for locating celestial bodies of the present invention; and FIG. 2 is an exploded view taken in perspective thereof.

In the drawings wherein similar elements are identified by like numerals throughout the several views, FIG. 1 illustrates the device 10 having a support platform 12 onto which is mounted a level indicator 14 and direction indicator 16. Pivotally disposed to the support platform 12 is inclined platform 18. In cooperation with support platform 12, inclined platform 18, having latitude indicator 20 disposed along one side thereof, which serves to creal plate 18 to parallel the plane of the earth's equator. Location of latitude indicator 20 may be fixed at a given indicator location by a suitable clamp 22 such as a thumb screw or the like fixed into support platform 12.

Disposed on inclined platform 18 is right ascension-azimuth dial 24 which is rotatably attached to inclined platform 18 and thereon is disposed right ascension declination scale piece 26, also movable about a common center point. The right ascension declination scale piece is comprised of a pointer 28 joined by a vertical scale plate 30 disposed at about right angle. An arm 32 is pivoted at a point along the surface of the vertical scale plate 30 and is used to support and locate in relative position a telescope 34 which serves to view the located celestial bodies.

The present device is complemented by available data published on celestial locations such as reference publications by *The American Emphemeris and Nautical Almanac*, the *Observer's Handbook* or related publications which disclose the right ascension and declination coordinates, precise to the second, of visible stars, planets, satellites and the like. The present device is usable with most any star table by means of the right ascension and declination variables which define a simple, accurate and convenient means to locate celestial bodies.

The graduations on latitude indicator 20 may be at some convenient scale such as every 5 or 10 degrees. Similarly, the graduations on right ascension-azimuth dial 24 may begin at 0° and correspond to 90°, 180° and 270° graduations corresponding to the compass points for azimuth readings, and also begin at 0 hour mark and increase through 24 hour graduations in a counterclockwise progression for right ascension readings. The graduations on the vertical scale plate 30 may vary as desired such as ± numeral factors of declination. Reference is made to FIG. 2 for more detailed reading of graduations.

In operation, observations of heavenly bodies may be carried out on the basis of the azimuth and declination position of the body on the elements 24 and 26 respectively, taken in connection with the time and date of observation. The latitude platform 20 serves as a convenient means to locate the local meridian, i.e., the imaginary plane which begins at the earth's north pole, passes through the location of the observer, and continues to the south pole. The index for the degree setting of the latitude platform is by inscription relative to the horizontal platform 12.

The telescope 34 is set for the declination of a heavenly body by means of the appropriate graduations on the declination scale 30.

Unless observations are made precisely at zero meridian, meridians located every 15° of longitude starting at Greenwich, England, must be converted from standard time to local means time such that zero meridian and local mean times correspond. This conversion is made by determining how far, in degrees, the observer is located east or west of zero meridian. These meridian lines can be corrected by disc 24. Knowledge of local mean time serves in effect to standardize the present device.

In operation, the platform 12 is placed in any suitable stable surface, and is set by compass 16 to a northerly direction while leveling the platform 12 by means of indicator 14 to level position. Corrections for magnetic variation of the pole difference may be made in the known fashion. This is, the hinged edge faces north for use in the Northern Hemisphere, and faces south for use in the Southern Hemisphere.

In order to locate a star, the right ascension and declination coordinates are located in a reference publication. These are set by pointer 28 to corresponding right ascension values on dial 24 which is first set to reflect lateral variations. The declination coordinates are set on the index values on vertical support 30. When both of these values are set one need only look into the telescope to locate the star or celestial body being viewed.

By simple variation, the present device may be used to locate a planet, identify stars, determine time of sunrise and sunset, and measure time by means of the sun.

It will be apparent to those skilled in the art that variations may be made in construction of the present device without departing from the invention claimed.

What is claimed is:

1. A device for locating celestial bodies, which comprises in combination a horizontally supporting platform having a level indicator and direction indicator for manual control and setting of said support platform both for direction and level, an inclined platform pivotally supported at one end of said horizontal supporting platform having a latitude indicator mounted to one inclined edge of said inclined platform and means for fastening said platforms together at a selected latitude angle, adjustably setting the angle of said inclined platform to said horizontal platform defining an arc of the horizon measured between the fixed point setting of the horizontal plane defined in true level of said support platform and a vertical arc passing through the center of a celestial body to be viewed, a right ascension-azimuth dial pivotally supported for rotation centrally in the inclined plane surface of the inclined platform and having dial markings thereon corresponding to the sidereal time in hours, a right ascension declination scale having a pointer plate right-angularly fastened to a vertical scale plate and pivotally supported through the axis of said ascension-azimuth dial for rotation as guided by the said dial markings thereon and setting of a direction pointing to a celestial body to be located by the horizontally supported pointer end thereof, said vertical scale plate having an arcuate upper end and angular scale markings on the vertical surface along its arcuate edge for measurement of the arcuate position of a telescope support arm, said support arm being pivotally supported for rotation in an arc corresponding to said angular scale markings thereon, said pivotal support including means for fastening said support arm in selected arcuate pivotal position measured by said angular markings on said vertical scale plate, said arm supporting a telescope at right angles thereto and in the plane of rotation of said arm, whereby the direction of said telescope is measurably set in pivotally fastened position of said support arm to said vertical scale plate.

* * * * *